United States Patent
Deevy

(10) Patent No.: US 10,568,262 B2
(45) Date of Patent: Feb. 25, 2020

(54) ACTIVELY SYNCHRONIZED DUAL RECIPROCATING-KNIFE CUTTER BAR

(71) Applicant: CNH Industrial America LLC, New Holland, PA (US)

(72) Inventor: Joseph P. Deevy, Strasburg, PA (US)

(73) Assignee: CNH Industrial America LLC, New Holland, PA (US)

(*) Notice: Subject to any disclaimer, the term of this patent is extended or adjusted under 35 U.S.C. 154(b) by 177 days.

(21) Appl. No.: 15/718,658

(22) Filed: Sep. 28, 2017

(65) Prior Publication Data

US 2019/0090422 A1    Mar. 28, 2019

(51) Int. Cl.
| A01D 34/30 | (2006.01) |
| A01D 41/127 | (2006.01) |
| A01D 34/14 | (2006.01) |
| A01D 41/14 | (2006.01) |
| A01D 34/04 | (2006.01) |
| A01D 41/06 | (2006.01) |

(52) U.S. Cl.
CPC ......... *A01D 41/1274* (2013.01); *A01D 34/14* (2013.01); *A01D 34/30* (2013.01); *A01D 41/142* (2013.01); A01D 34/04 (2013.01); A01D 41/06 (2013.01)

(58) Field of Classification Search
CPC .. A01D 41/1274; A01D 41/142; A01D 41/06; A01D 34/14; A01D 34/30; A01D 34/04; A01D 34/305
See application file for complete search history.

(56) References Cited

U.S. PATENT DOCUMENTS

| 4,216,641 | A | * | 8/1980 | Koch ................... A01D 34/30 56/14.4 |
| 4,227,685 | A | * | 10/1980 | Fischer ................. B65H 9/163 271/13 |
| 5,787,786 | A | | 8/1998 | Zeuner |
| 7,658,059 | B2 | * | 2/2010 | Majkrzak ............... A01D 34/38 56/264 |
| 8,973,345 | B2 | | 3/2015 | Brimeyer et al. |
| 2006/0042217 | A1 | * | 3/2006 | Buermann ........... A01D 41/142 56/257 |
| 2008/0046154 | A1 | * | 2/2008 | Bares ................... A01D 46/085 701/50 |
| 2016/0324071 | A1 | | 11/2016 | Wenger et al. |

* cited by examiner

Primary Examiner — Robert E Pezzuto
Assistant Examiner — Adam J Behrens
(74) Attorney, Agent, or Firm — Peter K. Zacharias; Patrick M. Sheldrake

(57) ABSTRACT

An agricultural vehicle includes a chassis and a header. The header includes a cutter bar and a cutter bar feedback control system. The cutter bar is moveably connected to the header and has a first knife and a second knife. The cutter bar feedback control system is coupled to the cutter bar and is configured for selectively controlling a speed of the second knife. The cutter bar feedback control system includes a continuously variable transmission that is operably coupled to the second knife, a first sensor operably coupled to the first knife, a second sensor operably coupled to the second knife, and a controller in communication with the continuously variable transmission, the first sensor, and the second sensor. The controller is configured for controlling the continuously variable transmission to control the speed of the second knife such that the first knife and second knife synchronously reciprocate in opposing directions.

14 Claims, 2 Drawing Sheets

ACTIVELY SYNCHRONIZED DUAL RECIPROCATING-KNIFE CUTTER BAR

FIELD OF THE INVENTION

The present invention pertains to agricultural vehicles and, more specifically, to agricultural vehicles that include a header.

BACKGROUND OF THE INVENTION

An agricultural vehicle known as a "combine" is historically termed such because it combines multiple harvesting functions with a single harvesting unit, such as picking, threshing, separating, and cleaning. A combine generally includes a header, a feeder housing, a threshing rotor, and various other systems for the separation, cleaning, and temporary storage of the crop material. The header removes the crop material from a field and transports the crop material to the feeder housing.

A typical header for an agricultural vehicle includes one or more cutters, e.g., cutter bars with reciprocating knives, which cut the crop material that is harvested from the field. Generally, the cutter bars are driven in a linearly reciprocal manner by a knife drive, such as a "wobble box" or epicyclic gear drive. The knife drive is usually powered by a mechanical drivetrain that extends from the combine. Thereby, the knife drive converts rotary motion from the mechanical drivetrain into a linear motion that drives the cutter bar. As is common with some larger headers, the cutter bar may be split into two separate halves, which are each separately driven. This particular type of cutter bar may be referred to as a dual reciprocating-knife cutter bar.

Reciprocating-knife cutter bars may negatively impact the function and life of the header due to the generation of vibration the cutter bar as the knife drive(s) cyclically accelerate the mass of each cutter bar section. For example, the header may experience unwanted forces which reduce its operating life, and the cutter bar may strip the crop material instead of cleanly severing the crop material from the ground. To reduce this vibration, a dual reciprocating cutter bar is often "timed" to have the cutter bar sections reciprocate in opposing directions, so that the forces acting to move the two knives cancel each other. However, issues may still persist as the cutter bar halves may subsequently become unsynchronized or untimed due to slight differences in speed between the two cutter bar halves.

Some dual reciprocating cutter bars include additional components to ensure proper synchronization of the cutter bar halves. U.S. Pat. No. 8,973,345 discloses a centrally located synchronization transmission that is coupled to each cutter bar section, and which forces each section to move with a 180-degree phase shift relative to one another. U.S. Pat. No. 7,658,059 discloses a synchronous drive system that includes a controller, a pair of sensors, and a pair of hydraulic motors that are coupled to a hydraulic valve and which respectively drive the cutter bar sections. The controller monitors the position of each cutter bar section via the sensors, and the controller manipulates the valve to synchronize the motors by bleeding off a portion of the hydraulic fluid flow to slow down the master motor so that it matches the speed of the slave motor. Thus, the cutter bar halves will reach the end of their strokes at the same time. However, such prior art solutions may be complex, costly to maintain, and may increase manufacturing costs.

What is needed in the art is a cost-effective and reliable synchronization system for synchronizing a dual reciprocating-knife cutter bar.

SUMMARY OF THE INVENTION

In one exemplary embodiment provided in accordance with the present invention, a header includes a cutter bar that has a cutter bar feedback control system. The cutter bar feedback control system includes a continuously variable transmission, a pair of sensors, a variable speed motor, and a controller.

In another exemplary embodiment provided in accordance with the present invention, an agricultural vehicle includes a chassis and a header coupled to the chassis. The header includes a cutter bar moveably connected to the header. The cutter bar has a first knife and a second knife. The first and second knives are configured for linearly reciprocating in opposing directions. The header also includes a cutter bar feedback control system that is coupled to the cutter bar. The cutter bar feedback control system is configured for selectively controlling a speed of the second knife. The cutter bar feedback control system includes a continuously variable transmission operably coupled to the second knife and a first sensor operably coupled to the first knife. The first sensor provides a first position signal of the first knife. The cutter bar feedback control system also includes a second sensor operably coupled to the second knife. The second sensor provides a second position signal of the second knife. The cutter bar feedback control system also includes a controller in communication with the continuously variable transmission, the first sensor, and the second sensor. The controller is configured for controlling the continuously variable transmission to control the speed of the second knife such that the first knife and second knife synchronously reciprocate in opposing directions.

In yet another exemplary embodiment provided in accordance with the present invention, a cutter bar coupled to a header of an agricultural vehicle includes a first knife configured for linearly reciprocating in a first direction and a second knife configured for linearly reciprocating in a second direction opposite to the first direction of the first knife. The cutter bar also includes a cutter bar feedback control system configured for selectively controlling a speed of the second knife. The cutter bar feedback control system includes a continuously variable transmission operably coupled to the second knife and a first sensor operably coupled to the first knife. The first sensor provides a first position signal of the first knife. The cutter bar feedback control system also includes a second sensor operably coupled to the second knife. The second sensor provides a second position signal of the second knife. The cutter bar feedback control system also includes a controller in communication with the continuously variable transmission, the first sensor, and the second sensor. The controller is configured for controlling the continuously variable transmission to control the speed of the second knife such that the first knife and second knife synchronously reciprocate in opposing directions.

In yet another exemplary embodiment provided in accordance with the present invention, a method for operating a header of an agricultural vehicle, includes the steps of providing a cutter bar that is moveably connected to the header. The cutter bar includes a first knife and a second knife. The first and second knives are configured for linearly reciprocating in opposing directions. The cutter bar also includes a cutter bar feedback control system that is coupled to the cutter bar and is configured for selectively controlling a speed of the second knife. The cutter bar feedback control system includes a continuously variable transmission operably coupled to the second knife and a first sensor operably coupled to the first knife. The first sensor provides a first position signal of the first knife. The cutter bar feedback control system also includes a second sensor operably coupled to the second knife. The second sensor provides a second position signal of the second knife. The cutter bar feedback control system also includes a controller in communication with the continuously variable transmission, the first sensor, and the second sensor. The controller is configured for controlling the continuously variable transmission to control the speed of the second knife such that the first knife and second knife reciprocate in opposing directions. The method includes a further step of sensing the first position signal of the first knife and the second position signal of the second knife respectively by the first and second sensors. The method includes a further step of monitoring, by the controller, a difference between the first position signal of the first knife and the second position signal of the second knife. The method also includes the step of controlling, by the controller, the continuously variable transmission to control the speed of the second knife dependent on the difference between the first position signal and the second position signal such that the first knife and the second knife synchronously reciprocate in opposing directions.

An advantage of the present invention is that the reciprocating motion of each knife of the cutter bar is synchronized.

Another advantage of the present invention is that the cutter bar feedback control system is cost-effective in that the cutter bar feedback control system controls one knife of the cutter bar by way of a difference in the positions of the knives.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
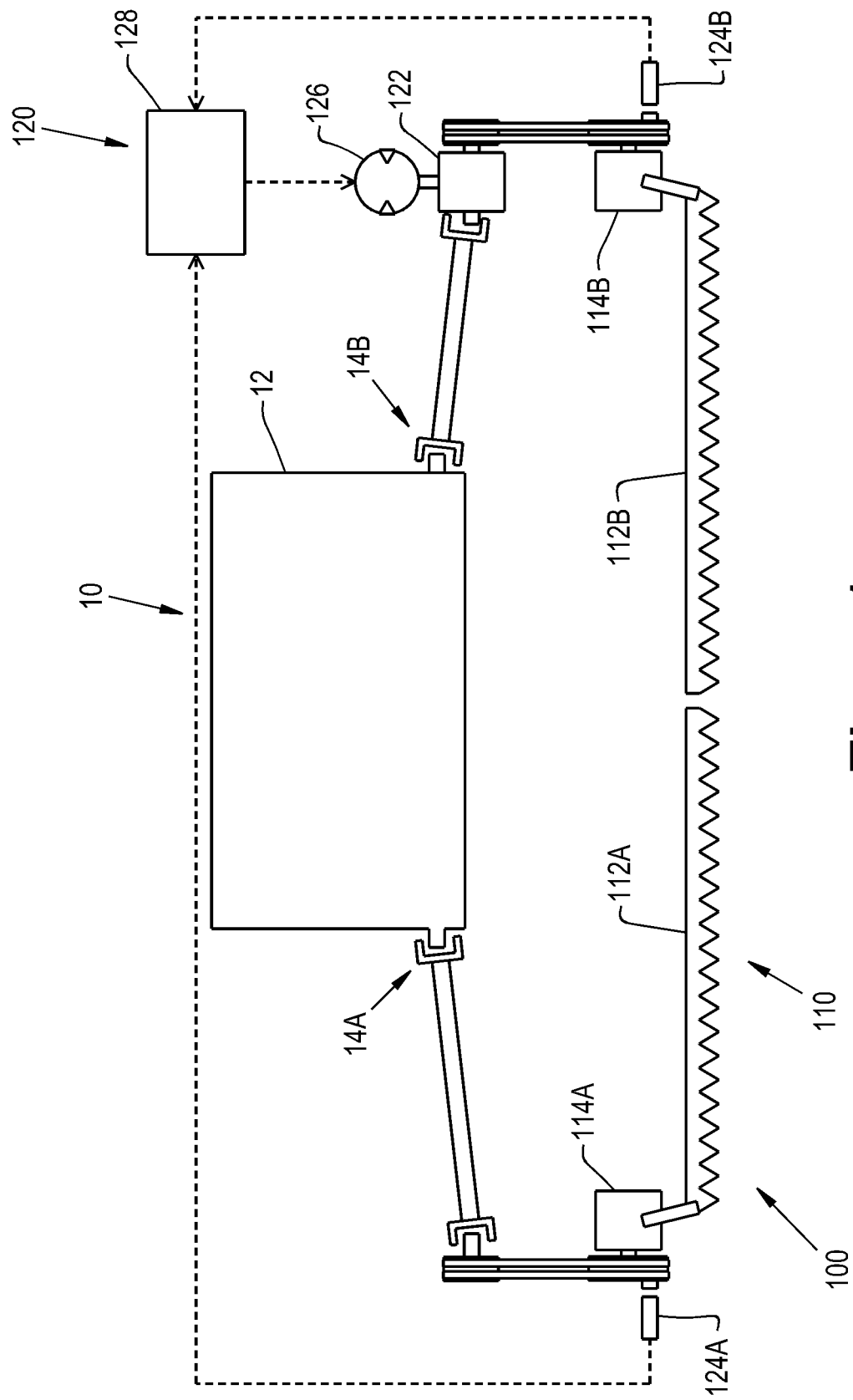
FIG. 1 illustrates a perspective view of an exemplary embodiment of a header, the header comprising a cutter bar and a cutter bar feedback control system, in accordance with an exemplary embodiment of the present invention.

Referring now to FIG. 1, there is shown an agricultural vehicle 10 which generally includes a chassis 12, a pair of power take off members 14A. 14B (PTO), and a header 100. The header 100 generally includes a cutter bar 110 and a cutter bar feedback control system 120. It should be appreciated that the header 100 may be incorporated in any agricultural vehicle such as a combine, a windrower, or any other prime mover that is used for cutting crop material. The header 100 may additionally include various components and systems for the collection and transportation of the crop material; however, such components and systems have been hidden from view for brevity of description.

The cutter bar 110 may be moveably connected to the header 100. The cutter bar 110 may be in the form of a dual reciprocating-knife cutter bar which has a pair of knives 112A, 112B which linearly reciprocate in opposing directions. The cutter bar 110 may also include a pair of knife drives 114A, 114B, e.g., wobble boxes, that respectively drive each knife 112A, 112B from their respective ends. The knife drives 114A, 114B may each be operably coupled to the mechanical drivetrains of the agricultural vehicle 10. For example, the knife drives 114A, 114B may be operably coupled to the PTO members 14A, 14B of the agricultural vehicle 10, respectively. In this regard, the knives 112A, 112B are respectively and separately driven by the PTO members 14A, 14B of the agricultural vehicle 10.

The cutter bar feedback control system 120 may be coupled to the cutter bar 110. The cutter bar feedback control system 120 may be configured for selectively controlling the speed of the knife 112B. The cutter bar feedback control system 120 may generally include a continuously variable transmission 122 (CVT), a pair of sensors 124A, 124B, a variable speed motor 126, and a controller 128.

The CVT 122 may be operably coupled to the second knife 112B. In other words, the CVT 122 may be coupled in between the PTO member 14B and the knife drive 114B. The CVT 122 may also be in communication with the controller 128. The CVT 122 may be in the form of a planetary CVT, a variable diameter pully CVT, a toroidal CVT, and/or a roller-based CVT. For example, the CVT 122 may be in the form of a planetary CVT 122 which receives inputs from the PTO member 14B and the motor 126. It is also conceivable to include more than one CVT 122 in order to effectuate movement on the knife 112B. It should be appreciated that a CVT input and/or output speed sensor may be operably coupled to the CVT 122 in order to monitor the speed of the CVT 120.

The sensors 124A, 124B may be operably coupled to the knives 112A, 112B, respectively. Thereby, the sensors 124A, 124B may respectively provide a position signal of the knives 112A, 112B. For instance, the sensors 124A, 124B may be in the form of position reference sensors, for example proximity or motion sensors, that monitor the positions of the knives 112A, 112B. Alternatively, the sensors 124A, 124B may sense a mechanically linked element of the knife drives 114A, 114B, e.g. the input shaft of the knife drives 114A, 114B. The position signal of the knives 112A, 112B which is generated by the sensors 124A, 124B may be indicative of the position of the knives 112A, 112B at any desired time and/or at any desired set position within the reciprocal cycle. For example, the sensors 124A, 124B may continuously sense the positions of the knives 112A, 112B throughout their range of motion, or the sensors 124A, 124B may only sense a position of the knives 112A, 112B when the knives 112A, 112B have reached an end of their reciprocal cycle. Additionally, for example, if the sensors 124A, 124B are in the form of proximity sensors 124A, 124B they may provide a reference pulse at one or more points in the reciprocal cycle of the knives 112A, 112B.

The motor 126 may be operably coupled to the CVT 122 and in communication with the controller 128. The motor 126 may adjust a rotational movement of the CVT 122 upon receiving a motor speed signal from the controller 128. For instance, the motor 126 may increase or decrease the rotational speed of the CVT 122. The motor 126 may be in the form of any desired hydraulic or electric motor.

The controller 128 may be in communication with the CVT 122, the sensors 124A, 124B, and/or the motor 126. The controller 128 may communicate to the CVT 122, the sensors 124A, 124B, and/or the motor 126 via a wired or wireless connection. The controller 128 may control the CVT 122 in order to control the speed of the knife 112B such that the knives 112A, 112B are synchronized and reciprocate in opposing directions. In other words, since the cutter bar control system 120 is a feedback control system, the controller 128 may control the CVT 122 depending upon the difference in the position signals (e.g. the position error) of the knives 112A, 112B. For example, the controller 128 may reduce the difference in the positions of the knives 112A, 112B to be approximately zero. The term approximately zero as used herein signifies a numerical value within the range of 0-0.5. In more detail, the controller 128 may control the speed of the knife 112B by way of adjusting the motor 126 so that the motor 126 increases or decreases the rotational speed of the CVT 122, which in turn alters the rotational speed of the knife drive 114B which then translates this rotational speed adjustment to the knife 112B. The controller 128 may be in the form of any desired controller such as a central processing unit (CPU). The controller 128 may be separate from and or incorporated into the control system of the header 100 and/or the agricultural vehicle 10.

Figure 2:
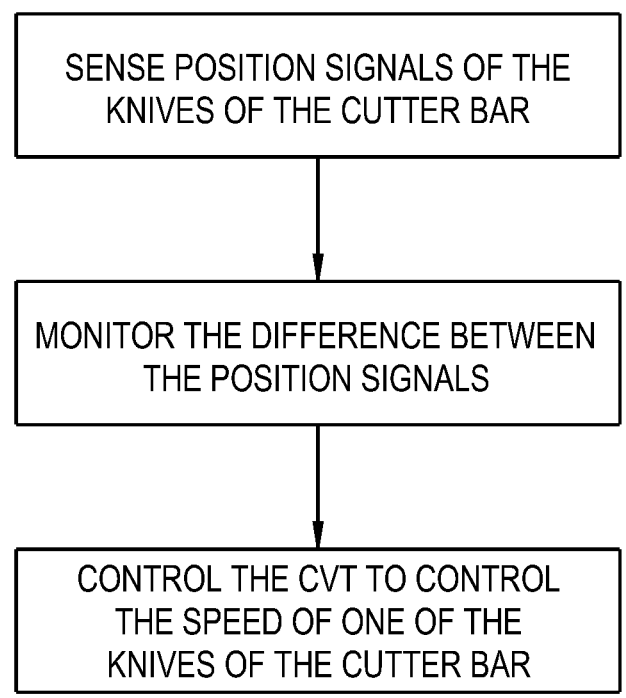
FIG. 2 illustrates a flow diagram of a method for operating the header as shown in FIG. 1, in accordance with an exemplary embodiment of the present invention.

Referring now to FIG. 2, there is shown a method of operation for the header 100. In operation, the cutter bar feedback control system 120 may actively control the synchronization of the cutter bar 110 as follows. The cutter bar feedback control system 120 may initially sense the positions of the knives 112A, 112B. In other words, the sensors 124A, 124B may sense the position signals of the knives 112A, 112B. The controller 128 may monitor the difference between the first and second position signals. The controller 128 may then control the CVT 122 in order to control the knife 112B, dependent on the difference in the first position signal of the knife 112A and the second position signal of the knife 112B. For example, the controller 128 may control the speed of the knife 112B such that the difference in the position signals is decreased to approximately zero. Thereby, the controller 128 may send the motor speed signal to the motor 126 so that the motor 126 adjusts the rotational movement of the CVT 122, which in turn adjusts the speed of the knife 112B.

The controller 128 may include software code or instructions which are tangibly stored on a tangible computer readable medium. The computer readable medium may be in the form of a magnetic medium, e.g., a computer hard drive, an optical medium, e.g., an optical disc, solid-state memory, e.g., flash memory, or other storage media known in the art. Thus, any of the functionality performed by the controller 128 described herein may be implemented in software code or instructions which are tangibly stored on the tangible computer readable medium. Upon loading and executing such software code or instructions by the controller 128, the controller 128 may perform any of the functionality described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler.

As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
    a chassis;
    a header coupled to the chassis, and including:
        a cutter bar moveably connected to the header and having a first knife and a second knife, said first and second knives being configured for linearly reciprocating in opposing directions; and
        a cutter bar feedback control system coupled to the cutter bar and configured for selectively controlling a speed of said second knife, said cutter bar feedback control system including:
            a continuously variable transmission operably coupled to the second knife;
            a variable speed motor operably coupled to said continuously variable transmission;
            a first sensor operably coupled to the first knife and providing a first position signal of the first knife;
            a second sensor operably coupled to the second knife and providing a second position signal of the second knife; and
            a controller in communication with said continuously variable transmission, said variable speed motor, said first sensor, and said second sensor, and said controller being configured for communicating a motor speed signal to said motor such that said motor adjusts a movement of said continuously variable transmission to increase or decrease the speed of the second knife such that the first knife and second knife synchronously reciprocate in opposing directions.

2. The agricultural vehicle of claim 1, wherein said controller of said cutter bar feedback control system controls the continuously variable transmission dependent on a difference in said first position signal of the first knife and said second position signal of the second knife.

3. The agricultural vehicle of claim 1, further including a first power take off member and a second power take off member such that said first knife is operably driven by the first power take off member and said second knife is operably driven by the second power take off member.

4. The agricultural vehicle of claim 3, wherein said cutter bar further includes a first knife drive operably coupled to the first knife and the first power take off member, and a second knife drive operably coupled to the second knife and the second power take off member.

5. The agricultural vehicle of claim 1, wherein said continuously variable transmission is at least one of a planetary, a variable diameter pully, a toroidal, and a roller-based continuously variable transmission.

6. A cutter bar coupled to a header of an agricultural vehicle, comprising:

a first knife configured for linearly reciprocating in a first direction;

a second knife configured for linearly reciprocating in a second direction opposite to the first direction of the first knife; and a cutter bar feedback control system configured for selectively controlling a speed of said second knife, said cutter bar feedback control system including:

a continuously variable transmission operably coupled to the second knife;

a variable speed motor operably coupled to said continuously variable transmission;

a first sensor operably coupled to the first knife and providing a first position signal of the first knife;

a second sensor operably coupled to the second knife and providing a second position signal of the second knife; and a controller in communication with said continuously variable transmission, said variable speed motor, said first sensor, and said second sensor, and said controller being configured for communicating a motor speed signal to said motor such that said motor adjusts a movement of said continuously variable transmission to increase or decrease the speed of the second knife such that the first knife and second knife synchronously reciprocate in opposing directions.

7. The cutter bar of claim 6, wherein said controller controls the continuously variable transmission dependent on a difference in said first position signal of the first knife and said second position signal of the second knife.

8. The cutter bar of claim 6, wherein said first knife and said second knife are independently driven respectively by a first power take off member and a second power take off member of the agricultural vehicle.

9. The cutter bar of claim 8, further including a first knife drive operably coupled to the first knife and the first power take off member, and a second knife drive operably coupled to the second knife and the second power take off member.

10. The cutter bar of claim 6, wherein said continuously variable transmission is at least one of a planetary, a variable diameter pully, a toroidal, and a roller-based continuously variable transmission.

11. A method for operating a header of an agricultural vehicle, comprising the steps of:

providing a cutter bar moveably connected to the header and having a first knife and a second knife, said first and second knives being configured for linearly reciprocating in opposing directions and a cutter bar feedback control system coupled to the cutter bar and configured for selectively controlling a speed of said second knife, said cutter bar feedback control system including a continuously variable transmission operably coupled to the second knife, a variable speed motor operably coupled to said continuously variable transmission, a first sensor operably coupled to the first knife and providing a first position signal of the first knife, a second sensor operably coupled to the second knife and providing a second position signal of the second knife, and a controller in communication with said continuously variable transmission, said variable speed motor, said first sensor, and said second sensor;

sensing the first position signal of the first knife and the second position signal of the second knife respectively by the first and second sensors;

monitoring, by said controller, a difference between the first position signal of the first knife and the second position signal of the second knife; and communicating, by said controller, a motor speed signal to said motor such that said motor adjusts a movement of said continuously variable transmission to increase or decrease the speed of said second knife dependent on said difference between the first position signal and the second position signal of the second knife such that the first knife and the second knife synchronously reciprocate in opposing directions.

12. The method of claim 11, wherein said step of controlling includes controlling the speed of the second knife such that said difference in said first and second position signals is decreased to approximately zero.

13. The method of claim 11, wherein said first knife and said second knife are independently driven respectively by a first power take off member and a second power take off member of the agricultural vehicle.

14. The method of claim 13, wherein said cutter bar further includes a first knife drive operably coupled to the first knife and the first power take off member, and a second knife drive operably coupled to the second knife and the second power take off member.

* * * * *